3,213,084
3,16,17-TRISUBSTITUTED 1,3,5(10)-ESTRATRIENES
Robert Eugene Schaub, Paramus, and Martin Joseph Weiss, Oradell, N.J., assignors to American Cyanamid Company, Stamford, Conn., a corporation of Maine
No Drawing. Filed Nov. 18, 1964, Ser. No. 412,257
20 Claims. (Cl. 260—239.5)

This is a continuation-in-part of application Serial No. 313,732, filed October 4, 1963, and now abandoned.

This invention relates to new steroid compounds. More particularly, it relates to 3,16,17-trisubstituted 1,3,5(10)-estratrienes and their preparation.

The novel steroids of the present invention may be illustrated by the following formula:

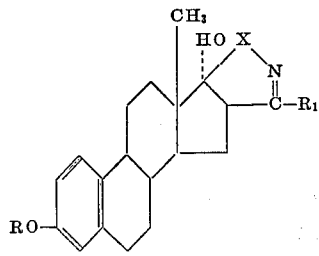

wherein R is selected from the group consisting of hydrogen and lower alkyl; $R_1$ is selected from the group consisting of hydrogen and lower carbalkoxy and X is selected from the group consisting of —O—,

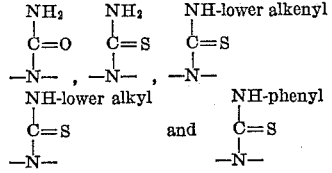

The present steroids are insoluble in water and somewhat soluble in the usual organic solvents such as acetone, ether, petroleum ether, hexane and the like.

The compounds of this invention are prepared from 16-hydroxymethylene or 16-alkoxalyl derivatives of 3-lower alkoxy-17-oxo-1,3,5(10)estratrienes by reaction with reagents such as hydroxylamine, thiosemicarbazide, $N_4$-alkyl, alkenyl, or aryl substituted thiosemicarbazides and semicarbazide. The syntheses are preferably carried out by warming an alcoholic solution of the reagent and the steroid. The desired products are obtained by the usual techniques of isolation, washing and crystallization, well known to those skilled in the art.

The invention also specifically includes the related ring-opened derivatives: 3-lower alkoxy-16α and 16β-(N-lower alkoxyiminomethyl)estra-1,3,5(10)-trien-17-ones and 3-lower alkoxy-16α and 16β-[N-(1-lower alkylthioureido)-iminomethyl]estra-1,3,5(10)-trien-17-ones and 3-lower alkoxy-16-(2' - lower alkyl)thiosemicarbazidomethyleneestra-1,3,5(10)-trien-17-ones. These compounds are prepared by treatment of a 16-hydroxymethylene-17-ketone with an o-lower alkyl hydroxylamine or an $N_3$-lower alkyl thiosemicarbazide.

Treatment with reagents of the former class gives a mixture of the epimeic 16β- and 16α-N-lower alkoxyiminomethyl derivatives (VIII and IX). With reagents of the latter class the epimeic 16β- and 16α-(1'-lower alkylthioureido)iminomethyl derivatives (X and XI) as the corresponding 16-(2'-lower alkyl)thiosemicarbazidomethylene-derivative is formed.

The following flowsheet illustrates the preparation of steroids of the present invention.

FLOWSHEET

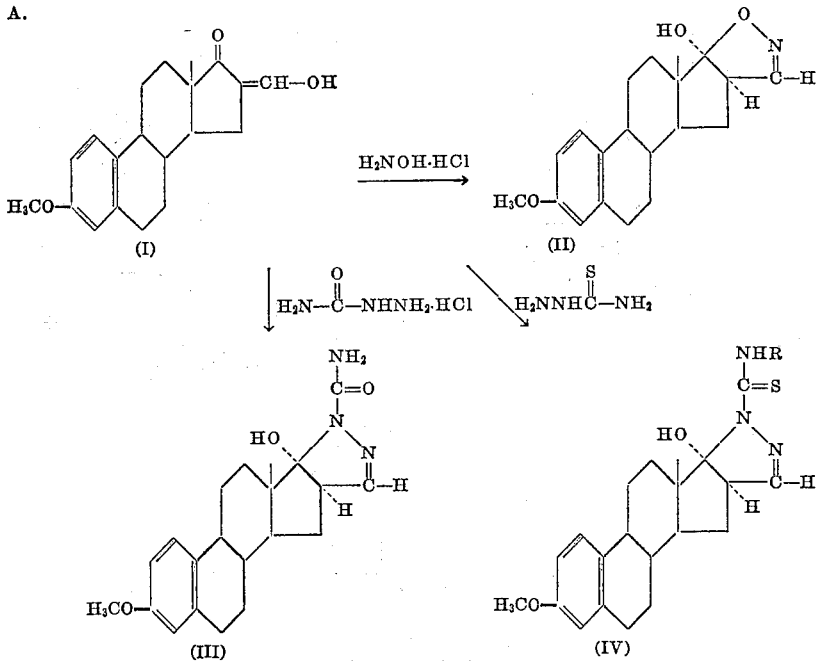

FLOWSHEET—Continued
B.
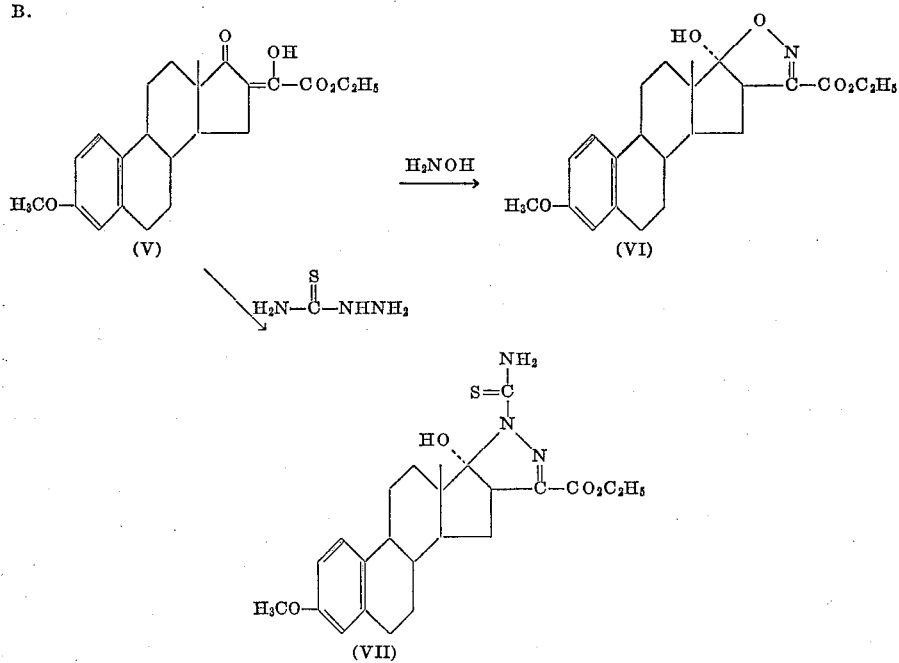
C.
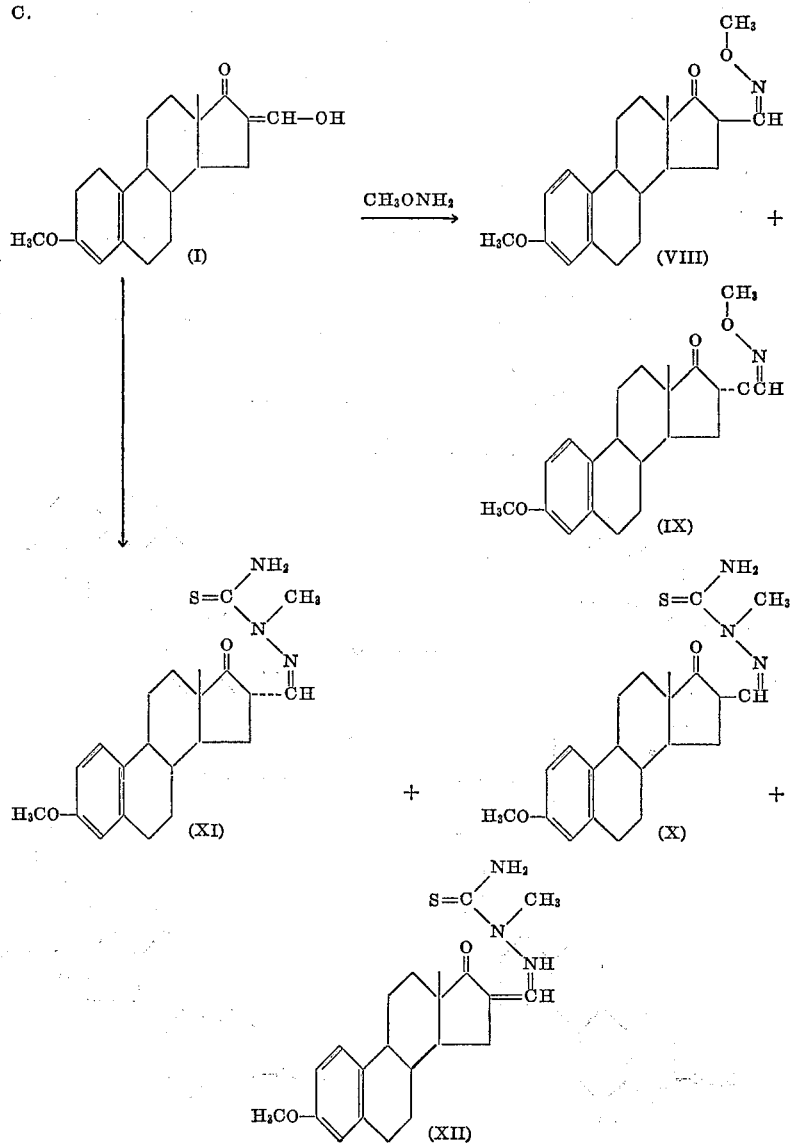

The estratriene derivatives of the present invention have estrogenic activity and are useful in estrogenic therapy and as agents for lowering blood cholesterol levels, hence as anti-atherosclerotic agents.

The following examples describe in detail the preparation of representative 3,16,17-trisubstituted 1,3,5(10)-estratrienes of this invention.

*Example I.*—*Preparation of 17α-hydroxy-3-methoxyestra-1,3,5(10)-trieno[16β,17β-d]-Δ$^{2'}$-isoxazoline (II)*

A suspension of 1 g. of 16-hydroxymethyleneestrone methyl ether [J. Chem. Soc., 1848 (1936)], and 245 mg. of hydroxylamine hydrochloride and 750 mg. of anhydrous sodium acetate in 30 ml. of absolute ethanol is heated at the refluxing temperatures for one hour. The solution then gives a negative test with 1% ethanolic ferric chloride solution. Dilution with water and filtration gives 947 mg. (96%) of product, melting point 216°–218° C., dec. Several recrystallizations from acetone-petroleum ether (boiling point 60°–70° C.) furnishes white crystals, melting point 221°–223° C., dec;

$$[\alpha]_D^{25} +105° \ (1.40\% \text{ in CHCL}_3)$$

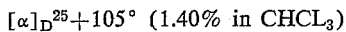
$\lambda_{max.}^{0.1 N \text{ HCl}}$ 223 mμ (ε9800), 280 mμ (ε1960); $\lambda_{max.}^{0.1 N \text{ NaOH}}$ 278 mμ (ε2450), 285 (sh) (ε2120); $\lambda_{max.}^{KBr}$ 3.06, 3.53, 6.20, 6.30, 6.64, 6.77, 6.85, 6.91, 9.12, 12.45μ

*Example II.*—*Preparation of 2'-carbamoyl-17α-hydroxy-3-methoxyestra - 1,3,5(10) - trieno[17β,16β-c]-Δ$^{1'(5')}$-pyrazoline (III)*

A suspension of 1 g. of 16-hydroxymethyleneestrone methyl ether, 394 mg. of semicarbazide hydrochloride and 530 mg. of anhydrous sodium acetate in 30 ml. of absolute ethanol is heated at the refluxing temperatures for two hours, solution being complete at the boiling point. The solution at this point gives a deep red color when reacted with 1% ethanolic ferric chloride solution. The mixture is then allowed to stir at room temperature for 18 hours, after which period the test with 1% ethanolic ferric chloride is negative. The precipitated solid is collected and washed with water and then with absolute ethanol to give 1.02 g. (87%) of product, melting point 219°–220° C., dec. Recrystallization from methylene chloride-ether does not alter the melting point, $$[\alpha]_D^{25} +100° \ (0.47\% \text{ in dioxane})$$

$\lambda_{max.}^{CH_3OH}$ 226 mμ (ε14,700), 278 mμ (ε1850), 288 mμ (ε1850); $\lambda_{max.}^{0.1 N \text{ HCl}}$ 223 mμ (ε14,000), 278 mμ (ε2200), 287 mμ (ε2200); $\lambda_{max.}^{0.1 N \text{ NaOH}}$ 334 mμ (ε20,000); $\lambda_{max.}^{KBr}$ 2.88, 2.96, 3.03, 3.09, 5.95, 6.20, 6.26, 6.65, 6.87, 7.98μ

*Example III.*—*Preparation of 17α-hydroxy-3-methoxy-2'-thiocarbamoylestra - 1,3,5(10) - trieno - [17β,16β-c]-Δ$^{1'(5')}$-pyrazoline (IV, R=H)*

A suspension of 1 g. of 16-hydroxymethyleneestrone methyl ether and 320 mg. of thiosemicarbazide in 30 ml. of absolute ethanol is heated at the reflux temperature for one hour. Solution is completed as the temperature approaches the boiling point and shortly thereafter solids begin to precipitate. After the heating period, the solution gives a negative test with 1% ethanolic ferric chloride solution. The solid is collected and washed several times with absolute ethanol to give 1.16 g. of product, melting point 223° C., dec. Recrystallization from acetone furnishes white crystals, with melting point of which is unchanged; $[\alpha]_D^{25}$ —197° (0.54% in dioxane);

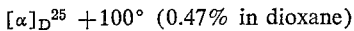
(ε18,300); $\lambda_{max.}^{0.1 N \text{ HCl}}$ 225 mμ (ε12,300), 230 mμ (ε11,700), 272 mμ (ε15,600); $\lambda_{max.}^{0.1 N \text{ NaOH}}$ 365 mμ (ε33,400); $\lambda_{max.}^{KBr}$ 2.87, 2.99, 3.09, 6.22, 6.73, 7.46μ

*Example IV.*—*Preparation of 17α-hydroxy-3-methoxy-2'-(N - methylthiocarbamoyl)estra - 1,3,5(10) - trieno-[17β,16β-c]-Δ$^{1'(5')}$-pyrazoline (IV, R=CH_3)*

Treatment of 500 mg. of 16-hydroxymethyleneestrone methyl ether in 20 ml. of absolute alcohol with 185 mg. of 4-methylthiosemicarbazide in the manner described above for the preparation of 17α-hydroxy-3-methoxy-2'-thiocarbamoylestra - 1,3,5(10)-trieno-[17β,16β-c]-Δ$^{1'(5')}$-pyrazoline (Example III) gives 422 mg. of product, melting point 195–196° C., dec. Recrystallization from methylene chloride-ether furnishes white crystals, melting point 198–199° C., dec.; $[\alpha]_D^{25}$ —214° (1.0% in CHCl_3);

$\lambda_{max.}^{CH_3OH}$ 223 mμ (ε10,200), 230 mμ (ε10,100) and 272 mμ (ε19,000); $\lambda_{max.}^{0.1 N \text{ HCl}}$ 223 mμ (ε10,200), 230 mμ (ε10,100) and 272 mμ (ε15,600); $\lambda_{max.}^{0.1 N \text{ NaOH}}$ 368 mμ (ε30,800); $\lambda_{max.}^{KBr}$ 3.00, 6.20, 6.50, 9.12μ

*Example V.*—*Preparation of 17α-hydroxy-3-methoxy-2'-(N - ethylthiocarbamoyl)estra - 1,3,5(10) - trieno-[17β,16β-c]-Δ$^{1'(5')}$-pyrazoline (IV, R=C_2H_5)*

Treatment of 500 mg. of 16-hydroxymethyleneestrone methyl ether in 20 ml. of absolute alcohol with 210 mg. of 4-ethylthiosemicarbazide in the manner described above for the preparation of 17α-hydroxy-3-methoxy-2'-thiocarbamoylestra - 1,3,5(10)-trieno-[17β,16β-c]-Δ$^{1'(5')}$-pyrazoline (Example III) gives 582 mg. of product, melting point 198–199° C. dec. Recrystallization from methylene chloride-ether affords white crystals, melting point 198–200° C. dec.; $[\alpha]_D^{25}$ —200° (1.0% in CHCl_3);

$\lambda_{max.}^{CH_3OH}$ 222 mμ (ε10,700), 230 mμ (ε9,700) and 273 mμ (ε17.000); $\lambda_{max.}^{0.1 N \text{ HCl}}$ 222 mμ (ε10,400), 230 mμ (ε9,900) and 273 mμ (ε13,200); $\lambda_{max.}^{0.1 N \text{ NaOH}}$ 368 mμ (ε28,200); $\lambda_{max.}^{KBr}$ 3.03, 6.20, 6.53, 9.13μ

*Example VI.*—*Preparation of 17α-hydroxy-3-methoxy-2'-(N,n - butylthiocarbamoyl)estra - 1,3,5(10) - trieno-[17β,16β-c]-Δ$^{1'(5')}$-pyrazoline (IV, R=n—C_4H_9)*

Treatment of 534 mg. of 16-hydroxymethyleneestrone methyl ether in 20 ml. of absolute alcohol with 275 mg. of 4-n-butylthiosemicarbazide in the manner described above for the preparation of 17α-hydroxy-3-methoxy-2'-thiocarbamoylestra-1,3,5(10)-trieno-[17β,16β-c] - Δ$^{1'(5')}$-pyrazoline (Example III) gives 604 mg. of product, melting point 161–165° C. Recrystallization from methylene chloride-ether furnishes white crystals, melting point 167–169° C.; $[\alpha]_D^{25}$ 179° (1% in CHCl_3);

$\lambda_{max.}^{CH_3OH}$ 222 mμ (ε12,800), 230 mμ (ε11,700) and 274 mμ (ε19,400); $\lambda_{max.}^{KBr}$ 3.02, 6.23, 6.37, 6.54μ

*Example VII.*—*Preparation of 17α-hydroxy-3-methoxy-2'-(N-allythiocarbamoyl)-estra-1,3,5(10)-trieno-[17β,16β-c]-Δ$^{1'(5')}$-pyrazoline (IV, R=CH_2CH=CH_2)*

Treatment of 500 mg. of 16-hydroxymethylene-estrone methyl ether in 20 ml. of absolute alcohol with 230 mg. of 4-allylthiosemicarbazide in the manner described above for the preparation of 17α-hydroxy-3-methoxy-2'-thiocarbamoyl - estra-1,3,5(10)-trieno-[17β,16β-c]-Δ$^{1'(5')}$-pyrazoline (Example III) affords 583 mg. of product, melting point 178–180° C. Recrystallization from methylene chloride-ether gives white crystals, melting point 179–181° C.; $[\alpha]_D^{25}$ —184° (1% in CHCl_3);

$\lambda_{max.}^{CH_3OH}$ 222 mμ (ε11,900), 230 mμ (ε10,600) and 277 mμ (ε18,700); $\lambda_{max.}^{0.1 N \text{ HCl}}$ 222 mμ (ε12,700), 230 mμ (ε11,700) and 276 mμ (ε19,500); $\lambda_{max.}^{0.1 N \text{ NaOH}}$ 370 mμ (ε33,000); $\lambda_{max.}^{KBr}$ 3.03, 6.20, 6.60, 9.15μ

*Example VIII.*—*Preparation of 17α-hydroxy-3-methoxy-2'(N - phenylthiocarbamoyl) - estra-1,3,5(10)-trieno-[17β,16β-c]-Δ$^{1'(5')}$-pyrazoline (IV, R=C_6H_5)*

Treatment of 500 mg. of 16-hydroxymethylene-estrone methyl ether in 20 ml. of absolute alcohol with 295 mg. of 4-phenylthiosemicarbazide in the manner described above for the preparation of 17α-hydroxy-3-methoxy-2′-thiocarbamoyl-estra-1,3,5(10)-trieno-[17β,16β-c]-Δ$^{1'(5')}$-pyrazoline (Example III) gives 319 mg. of product, melting point 159–160° C. dec. Recrystallization from methylene chloride-ether gives white crystals, melting point 160–161° C. dec.; [α]$_D^{25}$ —209° (0.9% in CHCl$_3$);

$\lambda_{max.}^{CH_3OH}$ 221 mμ (ε18,000), 230 mμ (ε13,100) and 278 mμ (ε23,000); $\lambda_{max.}^{0.1 N HCl}$ 222 mμ (ε17,000), 230 mμ (ε13,100) and 278 mμ (ε18,200); $\lambda_{max}^{0.1 N NaOH}$ 278 mμ (ε12,000) and 383 mμ (ε34,400); $\lambda_{max.}^{KBr}$ 3.02, 6.25, 6.60, 9.02, 13.35, 14.35μ

*Example IX.—Preparation of 16-ethoxalyl derivative of 3-methoxy-1,3,5-estratrien-17-one (V)*

To a solution of 1.14 g. (4 mmoles) of 3-methoxy-1,3,5-estratrien-17-one in 120 ml. of anhydrous benzene is added 1.8 ml. ethyl oxalate and 0.43 g. of 50% sodium hydride-oil dispersion. The reaction is started by the addition of a few drops of ethanol and the mixture is stirred under nitrogen for 16 hours. The yellow suspension is extracted several times with cold 1% aqueous potassium hydroxide solution and the extracts are added to aqueous 30% sodium dihydrogen phosphate solution. This mixture in turn is extracted with several portions of chloroform until these extracts no longer give a positive enol test with ferric chloride solution. The combined chloroform extracts are washed with water, dried and evaporated. The residue is crystallized from ether to give 1.16 g. of a solid (strong positive enol test), melting point 140–146° C. A sample recrystallized from acetone-hexane had a melting point 141–145° C., [α]$_D^{25}$ +63.4°;

$\lambda_{max.}^{CH_3OH}$ 285 mμ (ε9800 in acid), 298 mμ (ε11,600 in methanol); 302 mμ (ε20,600 in base); $\lambda_{max.}^{KBr}$ 5.74μ (s); 5.96μ (s); 6.21μ (s)

*Example X.—Preparation of 3′-carbethoxy-17α-hydroxy-3-methoxyestra-1,3,5(10)-trieno-[16β,17β-d]-Δ$^{2'}$-isoxazoline (VI)*

A suspension of 1 g. of the 16-ethoxalyl derivative of estrone-3-methyl ether ((V), Example IX) 200 mg. of hydroxylamine hydrochloride and 650 mg. of anhydrous sodium acetate in 30 ml. of absolute ethanol is stirred at the refluxing temperatures for 48 hours. The solution then gives a slightly positive enol test with 1% ethanolic ferric chloride, and is concentrated to a small volume under reduced pressure, water is added and the solid is collected by filtration to give 354 mg. (34%) of product, melting point 172–175° C. This material gives a negative enol test. Recrystallization from acetone-petroleum ether (boiling point 60–70°) gives white crystals, melting point 175–176° C.; [α]$_D^{25}$ —1.9° (1.1% in CHCl$_3$);

$\lambda_{max.}^{CH_3OH}$ 225 mμ (ε13,400), 279 mμ (ε2400) and 288 mμ (ε2200); $\lambda_{max.}^{0.1 N HCl}$ (ε13,400), 279 mμ (ε2200) and 284 mμ (ε2000); $\lambda_{max.}^{0.1 N NaOH}$ 279 mμ (ε2600), and 285 mμ (ε2200)

*Example XI.—Preparation of 16-hydroxymethyleneestrone 3-ethyl ether*

A solution of 7 g. of 3-ethoxyestra-1,3,5(10)-trien-17-one [Compt. Red. Soc. Biol., 104, 190 (1960)] in 250 ml. of benzene is freed from moisture by azeotropic distillation of 40 ml. of solvent. To the cooled, stirred solution there is added, under nitrogen atmosphere, 7.1 ml. of freshly distilled ethyl formate and 3.7 g. of a 55% oil suspension of sodium hydride. Absolute alcohol (0.2 ml.) is added to initiate the reaction and the mixture is then stirred at room temperature, under nitrogen atmosphere for 20 hours. After quenching with methanol the benzene solution is washed with 100 ml. of water, 200 ml. of 1% potassium hydroxide solution and finally with 100 ml. of water. The combined aqueous extracts are added to 175 ml. of saturated potassium dihydrogen phosphate solution. The resulting precipitate is extracted three times with methylene chloride and the combined extracts are washed with water, dried over anhydrous magnesium sulfate and evaporated to dryness under reduced pressure. The residual syrup is crystallized from methylene chloride-ether to give 4.71 g. of product, melting point 133–136° C. Recrystallization from the same solvent pair furnishes white crystals, melting point 132–135° C.; [α]$_D^{25}$ +140° (1% in CHCl$_3$);

$\lambda_{max.}^{KBr}$ 5.88, 5.91, 6.22, 6.36, 6.67, 8.05, 9.55μ

*Example XII.—Preparation of 3-ethoxy-17α-hydroxy-2′-thiocarbamoylestra-1,3,5(10)-trieno-[17β,16β-c]-Δ$^{1'(5')}$-pyrazoline*

Treatment of 500 mg. of 16-hydroxymethyleneestrone ethyl ether (Example XI) in 20 ml. of absolute alcohol with 150 mg. of thiosemicarbazide in the manner described above for the preparation of 17α-hydroxy-3-methoxy-2′-thiocarbamoylestra-1,3,5(10)-trieno-[17β,16β-c]-Δ$^{1'(5')}$-pyrazoline (Example III) furnishes 462 mg. of product, melting point 160–163° C. Recrystallization from acetone-petroleum ether (boiling point 60–70°) gives white crystals, melting point 169–171° C.; [α]$_D^{25}$ +61° (1% in CHCl$_3$);

$\lambda_{max.}^{CH_3OH}$ 222 mμ (ε14,000), 230 mμ (ε14,000) and 273 mμ (ε18,700); $\lambda_{max.}^{KBr}$ 2.96, 3.10, 6.32, 6.50μ

*Example XIII.—Preparation of 3,17α-dihydroxy-2′-thiocarbamoylestra-1,3,5(10)-trieno-[17β,16β-c]-Δ$^{1'(5')}$-pyrazoline*

Treatment of 1 g. of 16-hydroxymethyleneestrone [Helv. Chim. Acta., 31, 1296 (1948)] in 40 ml. of absolute alcohol with 330 mg. of thiosemicarbazide in the manner described above for the preparation of 17α-hydroxy-3-methoxy-2′-thiocarbamoylestra-1,3,5(10)-trieno-[17β,16β-c]-Δ$^{1'(5')}$-pyrazoline (Example III) affords 645 mg. of product, melting point 173–175° C. dec. Recrystallization from methylene chloride-ether does not alter the melting point; [α]$_D^{25}$ —218° (0.98% in dioxane);

$\lambda_{max.}^{CH_3OH}$ 222 mμ (ε10,800), 230 mμ (ε10,400) and 275 mμ (ε18,000); $\lambda_{max.}^{0.1 N HCl}$ 222 mμ (ε11,300), 230 mμ (ε10,600) and 275 mμ (ε17,500); $\lambda_{max.}^{0.1 N NaOH}$ 240 mμ (ε13,000) and 365 mμ (ε31,400); $\lambda_{max.}^{KBr}$ 3.00, 6.28, 6.78μ

*Example XIV.—Preparation of 3 - methoxy - 16β - (N-methoxyiminomethyl)estra-1,3,5(10)-trien-17-one (VIII) and 3-methoxy-16α-(N-methoxyiminomethyl)estra-1,3,5(10)-trien-17-one (IX)*

A suspension of 1 g. of 16-hydroxymethyleneestrone methyl ether, 750 mg. of anhydrous sodium acetate and 294 mg. of methoxyamine hydrochloride in 30 ml. of absolute ethanol is stirred at the refluxing temperatures for one hour. The cooled solution is diluted with water, concentrated under reduced pressure to remove the ethanol and filtered to furnish 758 mg. of a mixture of (VIII) and (IX), melting point 133–136° C. Recrystallization from acetone-petroleum ether gives white crystals, melting point 145–147° C.; [α]$_D^{25}$ +145° (0.6% in CHCl$_3$);

$\lambda_{max.}^{CH_3OH}$ 220 mμ (ε13,100), 278 mμ (ε2200) and 288 mμ (ε2200) (no change in aging for 5 days); $\lambda_{max.}^{0.1 N HCl}$ 220 mμ (ε13,800), 282 mμ (ε6300) and 290 mμ (ε5960); $\lambda_{max.}^{0.1 N NaOH}$ 319 mμ (ε11,700); $\lambda_{max.}^{KBr}$ 5.73, 6.19, 6.34, 6.66 7.96, 9.62μ, mm. v.

(Varian A–60 spectrometer, COCl$_3$ solution, tetramethylsilane as internal standard): C$_{18}$-CH$_3$, signals at 55 and 61 c.p.s., 232 c.p.s. (3-OCH$_3$), N-OCH$_3$ signals at 237 and 240 c.p.s., one proton doublet centered at 456.5 c.p.s. (J=5 c.p.s.,

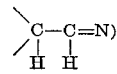

no active hydrogen observed on exchange experiments with $H_2O$, the intensity ratio of the $C_{18}$-$CH_3$ signal pair and of the N-$OCH_3$ signal pair (each signal pair corresponds to one epimer), initially about 3:1 approaches 2:1 on standing in $COCl_3$ solution for up to two weeks.

*Example XV.—Preparation of 3-methoxy - 16β - [N-(1-methylthioureido)iminomethyl]estra - 1,3,5(10)-trien-17-one (X) and 3 - methoxy - 16α - [N-(1-methylthioureido)iminomethyl]estra - 1,3,5(10) - trien - 17 - one (XI) and 3 - methoxy-16-(2-methylthiosemicarbazido)methyleneestra-1,3,5(10)-trien-17-one (XII)*

A stirred solution of 500 mg. of 16-hydroxymethyleneestrone methyl ether and 185 mg. of 2-methylthiosemicarbazide in 25 ml. of absolute alcohol is heated at the reflux temperature for 18 hours during which period a solid material separates. The hot solution is filtered to give 415 mg. of product, melting point 207° C. dec. Recrystallization from methylene chloride-ether furnishes white crystals, melting point 207° C. dec.; $[\alpha]_D^{25}$ +145° (1% in $CHCl_3$);

$\lambda_{max.}^{CH_3OH}$ 230 mμ (ε11,300) 242 mμ (ε9,500), 281 mμ (ε21,100) and 300 mμ (shoulder) (ε14,200); $\lambda_{max.}^{KBr}$ 2.93 3.05, 5.75, 6.20, 6.32, 9.12μ

*Example XVI.—Preparation of 3,17α-dihydroxy-2'-(N-methylthiocarbamoyl) - estra - 1,3,5(10)trieno - [17β,16β-c]-Δ¹'(5')-pyrazoline*

Treatment of 500 mg. of 16 - hydroxymethyleneestrone in 20 ml. of absolute alcohol with 190 mg. of 4-methylthiosemicarbazide in the manner described above for the preparation of 17α-hydroxy-3-methoxy - 2' - thiocarbamoylestra - 1,3,5(10)-trieno-[17β,16β-c]-pyrazoline (Example III) affords 558 mg. of product, melting point 219–221° C. dec. Trituration with methylene chloride followed by filtration gives white crystals, melting point 221° C. dec.; $[\alpha]_D^{25}$ —175° (1.0% in dioxane);

$\lambda_{max.}^{KBr}$ 3.05, 6.21, 6.54, 6.66, 9.06μ

We claim:
1. A steroid of the formula:

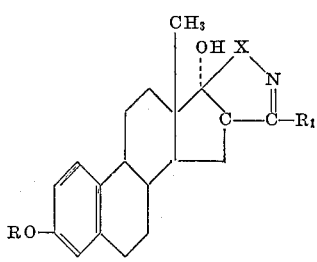

wherein R is selected from the group consisting of hydrogen and lower alkyl; $R_1$ is selected from the group consisting of hydrogen and lower carbalkoxy and X is selected from the group consisting of —O—, $$\begin{array}{ccc} NH_2 & NH_2 & NH\text{-lower alkenyl} \\ | & | & | \\ C=O & C=S & C=S \\ | & | & | \\ -N- & , -N- & , -N- \end{array}$$

$$\begin{array}{cc} NH\text{-lower alkyl} & NH\text{-phenyl} \\ | & | \\ C=S & C=S \\ | & | \\ -N- & , \text{ and } -N- \end{array}$$

2. 17α - hydroxy - 3 - methoxyestra-1,3,5(10)-trieno-[16β,17β-d]-Δ²'-isoxazoline.
3. 2' - carbamoyl - 17α - hydroxy - 3 - methoxyestra-1,3,5(10)-trieno-[17β,16β-c]-Δ¹'(5')-pyrazoline.
4. 17α - hydroxy - 3 - methoxy-2'-thiocarbamoylestra-1,3,5(10)-trieno-[17β,16β-c]-Δ¹'(5')-pyrazoline.
5. 17α - hydroxy - 3 - methoxy - 2' - (N-methylthiocarbamoyl)estra - 1,3,5(10) - trieno-[17β,16β-c]-Δ¹'(5')-pyrazoline.
6. 17α - hydroxy - 3 - methoxy-2'-(N-allylthiocarbamoyl)estra-1,3,5(10)-trieno-[17β,16β-c]-Δ¹'(5')-pyrazoline.
7. 3,17α - dihydroxy - 1' - (N - methylthiocarbamoyl)estra-1,3,5(10)-trieno-[17β,16β-c]-Δ¹'(5')-pyrazoline.
8. 3' - carbethoxy - 17α - hydroxy - 3 - methoxyestra-1,3,5(10)-trieno-[16β,17β-d]-Δ²'-isoxazoline.
9. 17α - hydroxy - 3 - ethoxy - 2' - thiocarbamoylestra-1,3,5(10)-trieno-[17β,16β-c]-Δ¹'(5')-pyrazoline.
10. 3,17α - dihydroxy-2'-thiocarbamoylestra-1,3,5(10)-trieno-[17β,16β-c]-Δ¹'(5')-pyrazoline.
11. 3-lower alkoxy-16β-(N-lower alkoxyiminomethyl)estra-1,3,5(-10)-trien-17-one.
12. 3-methoxy - 16β - (N-methoxyiminomethyl)estra-1,3,5(10)-trien-17-one.
13. 3-lower alkoxy-16α-(N-lower alkoxyiminomethyl)estra-1,3,5(10)-trien-17-one.
14. 3 - methoxy - 16α - (N-methoxyiminomethyl)estra-1,3,5(10)-trien-17-one.
15. 3-lower alkoxy-16β-[N-(1-lower alkylthioureido)iminomethyl]estra-1,3,5(10)-trien-17-one.
16. 3 - methoxy - 16β - [N-(1-methylthioureido)iminomethyl]estra-1,3,5(10)-trien-17-one.
17. 3-lower alkoxy-16α-[N-(1-lower alkylthioureido)iminomethyl]estra-1,3,5(10)-trien-17-one.
18. 3 - methoxy - 16α - [N-(1-methylthioureido)iminomethyl]estra-1,3,5(10)-trien-17-one.
19. 3-lower alkoxy-16-(2-lower alkylthiosemicarbazido)methyleneestra-1,3,5(10)-trien-17-one.
20. 3 - methoxy - 16 - (2 - methylthiosemicarbazido)methylene-1,3,5(10)-trien-17-one.

No references cited.

LEWIS GOTTS, *Primary Examiner.*